United States Patent Office 2,809,968
Patented Oct. 15, 1957

2,809,968

NOVEL PHENTHIAZINE DERIVATIVES

Paul Gailliot, Paris, and Jacques Gaudechon, Thiais, France, assignors to Société des Usines Chimiques Rhone-Poulenc, Paris, France, a corporation of France No Drawing. Application January 9, 1956,
Serial No. 557,821

Claims priority, application France December 18, 1953

5 Claims. (Cl. 260—243)

This invention relates to novel derivatives of phenthiazine having valuable therapeutic properties and to a method for their preparation. It is a continuation-in-part of application Serial No. 474,584 filed December 10, 1954, now abandoned.

The therapeutically active compounds of this invention are bases represented by the general formula:

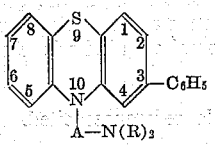

and the non-toxic quaternary ammonium and acid addition salts of such bases (e. g. those formed with 8-chlorotheophylline) wherein R represents a methyl or ethyl group and A represents a divalent straight or branched aliphatic chain containing 2 to 3 carbon atoms.

The compounds of the invention may be prepared by a process which comprises condensing 3-phenylphenthiazine with a tertiary aminoalkyl halide of the formula $X-A_1-N(R)_2$ wherein R has the meaning given above, X represents a halogen atom, and $A_1$ represents a divalent straight or branched aliphatic chain containing 2 to 3 carbon atoms which may be the same as the chain represented by A in the above general formula or, in the case of a branched chain, an isomeric form thereof.

The reaction is preferably carried out in the presence of an acid binding agent, being preferably a member of the class consisting of alkali metals and their derivatives, e. g. hydroxides, hydrides, amides, alcoholates, metal-alkyl and metal-aryl compounds. The preferred acid binding agents are sodamide, metallic sodium, powdered sodium hydroxide or potassium hydroxide, lithium hydride, sodium tertiary butylate, butyl lithium and phenyl lithium.

The reaction is also preferably carried out in an organic non-ionic diluent which is a solvent for at least one of the two reactants and at or in the neighbourhood of the boiling point of the solvent. It is particularly advantageous to use the tertiary aminoalkyl halide in the form of the free base in solution in an organic solvent, for example benzene, toluene or xylene, and to add the solution to a heated (preferably boiling) mixture of the phenthiazine compound, present in part at least in the form of an alkali metal salt, an acid-binding agent and said organic solvent. The reaction can also be carried out without acid-binding agent by introducing the solution of tertiary aminoalkyl halide, a little at a time, into the molten phenthiazine compound. When following either procedure it is necessary in order to avoid loss of organic diluent that the reaction vessel be an autoclave or be fitted with a reflux condenser.

The tertiary aminoalkyl halide can be employed in the form of an acid salt but, in this case, it is obviously necessary to add a greater proportion of acid-binding agent in order to neutralise the acid liberated from the acid salt.

When the halogen and nitrogen atoms of a dimethyl- or diethyl-amino halogenopropane starting material are substituted on adjacent carbon atoms, as for example in the case of 1-dimethylamino-2-chloropropane, the expected product having the following chain:

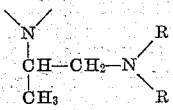

is not exclusively obtained but instead there is formed a mixture of this product and its isomer having the chain:

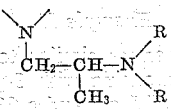

These can be separated by means of their hydrochlorides. Such separation is not, however, essential and where it is not effected a mixture of isomeric N-dialkylaminoalkyl phenthiazines is produced following the process of the invention.

The 3-phenylphenthiazine employed as starting material in the above-mentioned process may be prepared by the cyclisation of meta-phenyldiphenylamine with sulphur, desirably in the presence of iodine as catalyst at a temperature above 150° C. and preferably between 175° C. and 190° C. The cyclisation leads to a mixture of the 1- and 3-phenyl isomers which can be separated by the application of conventional techniques e. g. by fractional crystallisation from a suitable solvent such as a mixture of benzene and cyclohexane.

Suitable non-toxic quaternary and acid addition salts of the new bases are the hydrohalides, e. g. hydrochloride and hydrobromide, sulphates, maleates, fumarates, tartrates, citrates, oxalates, acetates and methane-sulphonates.

The products obtained in accordance with the invention have interesting pharmacodynamic properties rendering them of value in human and veterinary medicine. In particular they are potentiators of anaesthetics, analgesics and hypnotic agents, i. e. they increase or prolong the effect of such agents. As compared with potentiators of the prior art they present the important advantage of having a less tendency to cause undesirable secondary effects.

Compounds of outstanding interest are 10-(2'-dimethylaminoethyl)-3-phenyl-phenthiazine, 10-(3'-dimethylaminopropyl)-3-phenyl-phenthiazine, 10-(2'-dimethylaminopropyl-1')-3-phenyl-phenthiazine, 10-(1'-dimethylaminopropyl-2')-3-phenyl-phenthiazine and the salts of each of these compounds. Thus, for example, taking the preferred compound of these, viz. 10-(3'-dimethylaminopropyl)-3-phenyl-phenthiazine, the potentiating effect is illustrated by the following test. The compound is administered to test animals (mice) subcutaneously at a dosage of 20 mg./kg.; thirty minutes later hexobarbital is administered to the mice intravenously at a dosage of 50 mg./kg. A control test is carried out with mice which have received only the hexobarbital dosage. It is found that whereas the narcosis for the control animals lasts only 10 minutes, that for the animals which have received both the hexobarbital and the said phenthiazine compound is 44 minutes.

The following examples illustrate the invention. The melting points given are the instantaneous melting points on the Maquenne block.

*Example I*

A 14.6% solution (88 cc.) of 1-dimethylamino-2-chloroethane in xylene is added gradually over 20 minutes to a boiling suspension of 3-phenyl-phenthiazine, M. P. 175–

177° C. (27.5 g.) and 90% sodamide (6.5 g.) in xylene (250 cc.). Boiling is continued for two hours after the addition is complete. After cooling the mixture is treated with water (500 cc.) and made acid to methyl orange with hydrochloric acid (d=1.17, 21 cc.). The xylene is separated and the aqueous layer is washed with ether (250 cc.) and made alkaline to thymolphthalein with sodium hydroxide (d=1.33, 25 cc.) to liberate the base which is extracted with ether (2×150 cc.). The ethereal extract is dried over sodium sulphate, the ether is evaporated and the residue is distilled. 10-(2'-dimethylaminoethyl)-3-phenyl-phenthiazine (30.2 g.) distilling at 243–250° C./1 mm. Hg is obtained. The hydrochloride, prepared by treating the base dissolved in acetone with ethereal hydrogen chloride melts at 145–146° C.

*Example II*

Proceeding in a manner similar to that described in Example I, but commencing with 3-phenylphenthiazine, M. P. 175–177° C. (27.5 g.) and a 23% xylene solution (63 cc.) of 1-dimethylamino-3-chloropropane, the corresponding 10-(3'-dimethylaminopropyl)-3-phenyl-phenthiazine is obtained, B. P. 245–250° C./0.3 mm. Hg (hydrochloride M. P. 120° C.) (approx.).

*Example III*

Commencing with 3-phenylphenthiazine, M. P. 176–177° C. (17 g.) and a 19.6% solution (48 cc.) of 1-dimethylamino-2-chloropropane in xylene, a mixture of the corresponding bases 10-(2'-dimethylaminopropyl-1')-3-phenyl-phenthiazine and 10-(1'-dimethylaminopropyl-2')-3-phenyl-phenthiazine, B. P. 235–240° C./0.7 mm. Hg is obtained.

We claim:
1. The compound 10-(2'-dimethylaminoethyl)-3-phenyl-phenthiazine.
2. The compound 10-(3'-dimethylaminopropyl)-3-phenyl-phenthiazine.
3. The compound 10-(2'-dimethylaminopropyl-1')-3-phenyl-phenthiazine.
4. The compound 10-(1'-dimethylaminopropyl-2')-3-phenyl-phenthiazine.
5. A therapeutically active compound selected from the class consisting of compounds represented by the general formula:

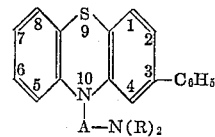

and the non-toxic acid addition salts thereof, wherein R represents a group selected from the group consisting of methyl and ethyl groups and A represents a divalent saturated wholly hydrocarbon aliphatic chain containing 2 to 3 carbon atoms.

No references cited.